United States Patent
Gandiga

(10) Patent No.: US 10,807,712 B2
(45) Date of Patent: Oct. 20, 2020

(54) SYSTEMS AND METHODS FOR TRANSFERRING CONTROL OF AN UNMANNED AERIAL VEHICLE

(71) Applicant: Ford Global Technologies, LLC, Dearborn, MI (US)

(72) Inventor: Sandeep Raj Gandiga, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 16/174,190

(22) Filed: Oct. 29, 2018

(65) Prior Publication Data
US 2020/0130829 A1    Apr. 30, 2020

(51) Int. Cl.
*B64C 39/02* (2006.01)
*G05D 1/00* (2006.01)
*G05D 1/10* (2006.01)

(52) U.S. Cl.
CPC ......... *B64C 39/024* (2013.01); *G05D 1/0022* (2013.01); *G05D 1/0061* (2013.01); *G05D 1/0088* (2013.01); *G05D 1/101* (2013.01); *B64C 2201/141* (2013.01); *B64C 2201/146* (2013.01)

(58) Field of Classification Search
CPC ............ B64C 39/024; B64C 2201/141; B64C 2201/146; G05D 1/0061; G05D 1/0022; G05D 1/101; G05D 1/0088
See application file for complete search history.

(56) References Cited

U.S. PATENT DOCUMENTS

| 9,459,620 B1 | 10/2016 | Schaffalitzky |
| 2014/0032034 A1 | 1/2014 | Raptopoulos et al. |
| 2017/0270314 A1 | 9/2017 | Tsybrovskyy et al. |
| 2018/0107211 A1 | 4/2018 | Schubert et al. |
| 2018/0155011 A1* | 6/2018 | Greiner .................. B64C 27/20 |

OTHER PUBLICATIONS

Kharpal, "Amazon's drones could follow you to work," CNBC, Published May 6, 2015, (4 pages). Retrieved from https://www.cnbc.com/2015/05/06/patent-filing-lifts-lid-on-amazons-drone-delivery-plans.html.

Margaritoff, "DelivAir Wants More Direct Drone Deliveries," the Drive, Published Oct. 4, 2017 (6 pages). Retrieved from http://www.thedrive.com/aerial/14851/delivair-wants-more-direct-drone-deliveries.

(Continued)

*Primary Examiner* — Yuen Wong
(74) *Attorney, Agent, or Firm* — Brandon Hicks; Eversheds Sutherland (US) LLP

(57) ABSTRACT

Systems and methods for transferring control of drones from one computing device to another during flight are disclosed. An example method may include accepting, by a drone control module of a computing device, a destination associated with a user. The method may further include establishing, by the drone control module, a channel of communication with a user device of the user. Thereafter, the drone control module may launch the drone from a first location. The method may further include transmitting, by the drone control module, control data for the drone to the user device via the channel of communication. The method may continue with transferring, by the drone control module, an operational control of the drone to the user device.

16 Claims, 8 Drawing Sheets

(56) References Cited

OTHER PUBLICATIONS

Zipkin, "Heads Up: Amazon Wants Delivery Drones to Find You Wherever You Are," Entrepreneur, Published May 11, 2015 (3 pages). Retrieved from https://www.entrepreneur.com/article/246103.

"Flirtey, the future of commercial drone delivery," RPAS Association Bulgaria (3 pages). Retrieved from http://rpasa.eu/index.php/en/news-3/news/17-flirtey-the-future-of-commercial-drone-delivery.

* cited by examiner

SYSTEMS AND METHODS FOR TRANSFERRING CONTROL OF AN UNMANNED AERIAL VEHICLE

TECHNICAL FIELD

The present disclosure relates generally to the operation of unmanned aerial vehicles and more specifically to system and methods for transferring control of an unmanned aerial vehicle from one device to another.

BACKGROUND

An unmanned aerial vehicle (UAV), also referred to herein as a "drone," is an unmanned aircraft remotely controlled by an operator. Drones are becoming more common in many fields of activity, such as search and rescue, security monitoring, video surveillance, photography and videography, transportation, delivery, and so forth. When the drones are used for product delivery, a delivery vehicle may be used to transport a delivery drone. However, even with the drone being transported near a customer location, last mile delivery by a drone may be difficult because of location access issues. In addition, the owner or primary operator of the drone may be unfamiliar with the area or unable to pinpoint a precise area for delivery or positioning of the drone. These issues can be even more pronounced in an urban environment where multi-story apartment, condo and office buildings can mean that the area that the drone needs to be located for delivery or positioning is not merely a street address but may more specifically be a particular apartment, condo, or office at that street address and located above street level. Even in situations where the owner or primary operator of the drone can see the desired destination for the drone, elevation difference can make properly controlling the drone to that destination difficult.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of this disclosure generally relate to systems and methods for controlling drones to deliver items. An example method may include accepting, by a drone control module of a computing device, a destination associated with a user. The method may further include establishing, by the drone control module, a channel of communication with a user device of the user. Thereafter, the drone control module may launch the drone from a first location. The method may continue with transmitting, by the drone control module, control data for the drone to the user device via the channel of communication. The method may further include transferring, by the drone control module, an operational control of the drone to the user device.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

For a more complete understanding of the present disclosure and certain features thereof, reference is now made to the following description, in conjunction with the accompanying figures briefly described as follows.

DETAILED DESCRIPTION OF EXAMPLE EMBODIMENTS

Figure 1:
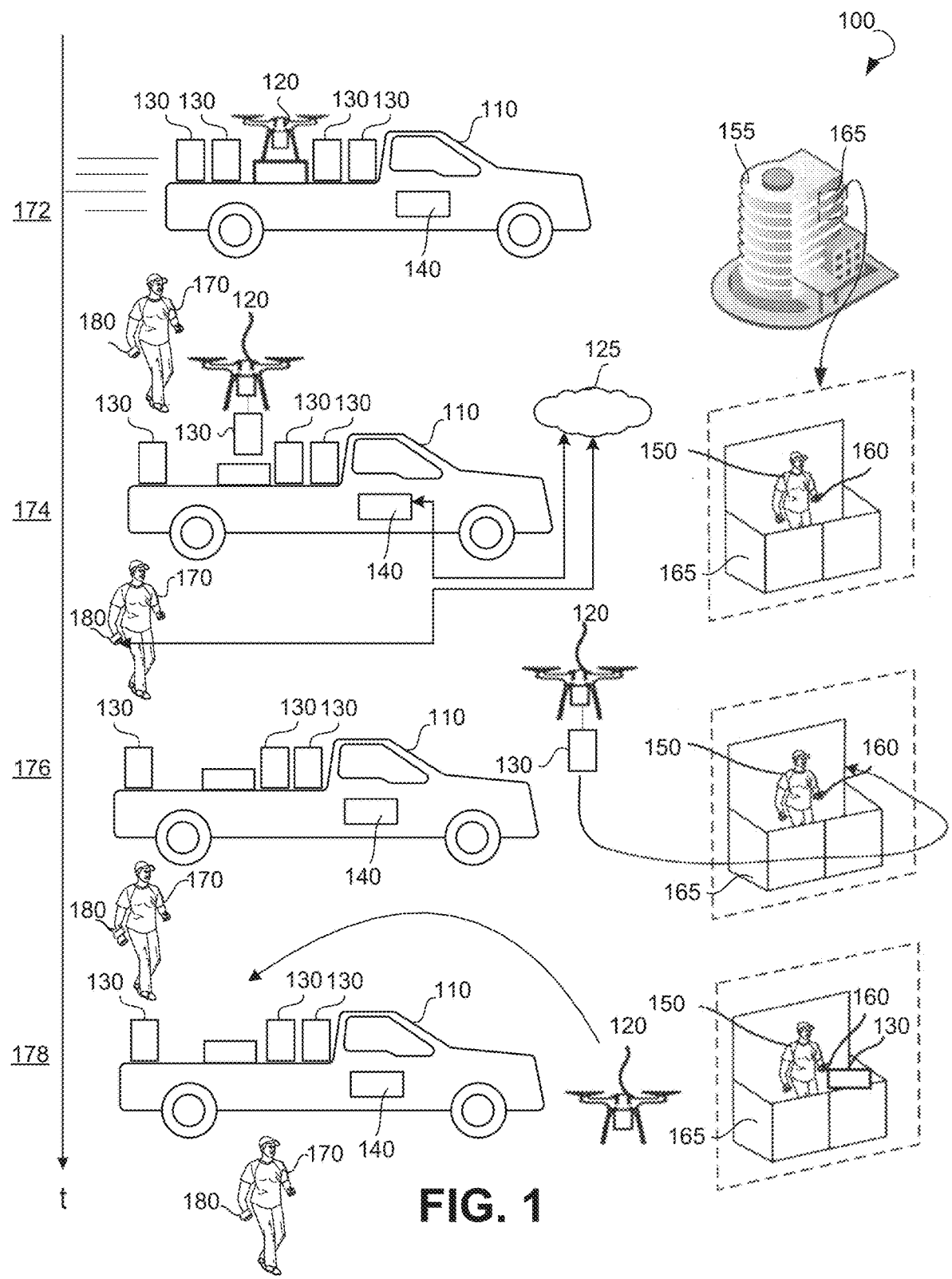
FIG. 1 is an illustrative figure showing the delivery of an item from a vehicle to a destination via a drone, in accordance with one or more example embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the systems and methods described herein. As those of ordinary skill in the art will understand, various features illustrated and described with reference to any one of the figures can be combined with features illustrated in one or more other figures to produce alternative embodiments that are not explicitly illustrated or described. The combinations of features illustrated provide representative embodiments for typical applications. Various combinations and modifications of the features consistent with the teachings of this disclosure, however, could be desired for particular applications or implementations.

For purposes of this disclosure, the term "vehicle" can refer to any land (terrain) device, system or apparatus for transporting, carrying, or conveying individuals or objects, including, without limitation, automobiles, buses, trucks, vans, sport utility vehicles, trailers, recreational vehicles, trains, railroad cars, boats, ships, farm equipment, mobile homes, electric cars, motorcycles, motorbikes, bikes, bicycles, all terrain vehicles, side-by-side vehicles, scooters, and so forth.

The term "UAV" can refer to an unmanned aerial vehicle, "drone," or an aircraft without a human pilot aboard. In some embodiments, the UAV may be an autonomous UAV. The operation of the UAV can be controlled remotely by a user using a computing device, also referred herein to as a user device, including, without limitation, a smart phone, cellular phone, laptop computer, tablet computer, desktop computer, in-vehicle computing device, and/or remote controller. As such, a user can use a computing device to remotely cause the UAV to lift off a launching pad, fly in various directions, land to the launching pad or another location, make photos or capture video, wirelessly transmit data, deliver items from the launch location to a destination, and the like.

Embodiments of the disclosure relate to systems and methods for transferring control of the operation of a drone from a first device to a second device. The systems and methods of the present disclosure may facilitate navigation of a drone to a customer without depending upon an unknown predetermined location for the delivery. An example method can commence with a drone being carried by a vehicle to a vicinity of the delivery location associated with a customer who has been preliminarily informed about the date and time of the delivery of an item.

The vehicle carrying the drone can be equipped with an in-vehicle (or portable) computing device which is responsible for the initial control of the drone. The in-vehicle computing device may communicate with a database of a delivery system to receive access to user profiles of customers. Based on a user profile associated with the customer, the in-vehicle computing device may determine whether the customer is certified and knowledgeable to fly drones. Upon arrival of the vehicle in the vicinity of the delivery location, the in-vehicle computing device may inquire whether the customer is ready to take over the control of the drone and navigate the drone to a specific delivery destination, such as a balcony, a roof, or a window. The customer may have a delivery application running on a customer user device and use the delivery application to communicate with the in-vehicle computing device and control the drone. Upon acknowledgement of the customer's readiness to control the drone, the in-vehicle computing device may launch the drone and transfer the control over the drone to the customer in mid-flight. The customer may then navigate the drone to the destination, receive an item carried by the drone and, optionally, navigate the drone back to a vicinity of the launching vehicle location, and transfer control over the drone back to the in-vehicle computing device.

In a further example embodiment, the in-vehicle (or portable) computing device may transfer the control over the drone to a person associated with the delivery service, such as a driver or a drone operator present on site or arriving in the vehicle. In this case, the driver or the drone operator may have a driver user device that receives control permission of the drone from the in-vehicle computer. The driver or drone operator, via the driver user device, may then navigate the drone to the destination, wait until the customer accepts the item carried by the drone, navigate the drone back to the vehicle, and transfer control over the drone from the driver user device back to the in-vehicle computing device.

In yet another example embodiment, upon arrival of the vehicle at the vicinity of the destination, the control over the drone may be initially provided by the driver or the drone operator. The driver or the drone operator may use a computing device, such as a smartphone or a drone remote control, to inquire whether the customer is ready to take the control over the drone. Thereafter, the driver or the drone operator may launch the drone from the vehicle and transfer control over the drone to the user device of the customer. The customer may navigate the drone to and from the destination and transfer the control over the drone back to the computing device of the driver or the drone operator.

The systems and methods of the present disclosure may also facilitate learning of the route from the launch location to the destination to allow the drone to fly to a desired delivery destination unassisted in the future. Once the navigation route is known, subsequent deliveries by the same or different drones to the same or substantially the same location can performed without handing off the control of the drone to the customer user device and/or the computer device of the driver or drone operator. Thus, during the first trip to the customer location, the drone can be controlled at least partially by the customer or by the person associated with the delivery service while during subsequent trips, the drone may follow the pre-stored navigation route and no additional control of the drone by the customer or the person associated with the delivery service would be needed.

The in-vehicle computing device may take control back from the user device under some predetermined circumstances, such as immediately after releasing or delivering the item to the destination, if technical difficulties related to the operation of the drone arise, if the drone sensor and camera data show that the customer is mishandling the drone, if one or multiple facial images of the customer do not match a saved image or images associated with the customer, and so forth.

There may be many reasons for transferring the drone operation control to the user device of the customer or to the computing device of the driver. For example, a pre-designated landing location or destination may out of sight of a driver or a drone operator. Furthermore, a customer typically has better familiarity with the delivery destination, and, therefore, can navigate the drone to the delivery destination better that the driver or the drone operator. Therefore, drone deliveries can be greatly facilitated when customers control the drone for at least a portion of the leg between the launch location and the delivery destination. It should be understood that the same or similar control transfer mechanism may be utilized in other drone-vehicle use cases. For example, the in-vehicle (or portable) computer of one vehicle may hand off the control over the drone to the in-vehicle (or portable) computer of another vehicle or device. For, example, the in vehicle computer of the controlling vehicle or device may be malfunctioning, the controlling vehicle may not be able to access certain areas that are accessible to the other vehicle, or there is a need to transfer the control from a drone control device of one operator to a drone control device of another operator such as between police officers or other first responders.

In accordance with some rules and regulations as applied to drones, a line of sight must be provided between a drone and a person controlling the drone. Optionally, the line of sight can be maintained by another person called a visual observer who can stay outside a vehicle. Maintaining the line of sight when the person is inside the vehicle could be tedious or not possible at all. Therefore, the control transfer mechanism may help to transfer the control from the in-vehicle computing device to the person standing outside the vehicle and have that person control the drone while maintaining the line of sight.

Additionally, when the drone is under control of the user device of the customer, the in-vehicle computing device may still function as a master device for controlling the drone. Therefore, commands received by the drone from the in-vehicle computing device may have higher priority than commands received by the drone from the user device of the customer.

Example embodiments are described with reference to the drawings. The drawings are schematic illustrations of idealized example embodiments. As such, variations of the devices, processes and methodologies described herein, are to be expected. Unless specifically stated, none of the devices, processes, or steps within the methodologies is required or essential. Further, in some examples, some steps may be omitted or optional and additional steps not shown may be included in any of the methodologies described herein. Thus, example embodiments discussed herein should not be construed as limited to the particular devices, systems, and/or methods that are shown and described.

FIG. 1 is an illustrative operational environment 100 showing the delivery of an item from a vehicle to a destination via a drone, in accordance with one or more example embodiments of the disclosure. Referring now to FIG. 1, at time position 172, a vehicle 110 may arrive at an area in a vicinity of a delivery location 155 associated with a customer 150. The vehicle 110 may be driven by a driver 170. In some example embodiments, a person associated with a delivery service, such as a drone operator, may also be present inside the vehicle 110. The vehicle 110 may carry a drone 120. The drone 120 may have an item 130 to be delivered to the customer 150.

In an example embodiment, the vehicle 110 may include an in-vehicle computing device 140. The in-vehicle computing device 140 may be configured to control the drone 120. While the computing device 140 is described as being in-vehicle, this description is not intended to limit the computing device 140 to always being maintained within the vehicle. In certain example embodiments, the in-vehicle computing device 140 can be a mobile computing device, such as a table computer, that can be docked to the vehicle 110 at certain times and can be removable from and used outside the vehicle 110 when desired. At time position 174, the in-vehicle computing device 140 may determine whether control over the drone 120 needs to the transferred to a user device 160 of the customer 150 or the drone 120 may fly to the delivery location 155 automatically based on information related to previous deliveries by the drone 120 to the same delivery location 155. The information may be stored in a database on a server/computing cloud 125 communicably coupled to the in-vehicle computing device 140. The user device 160 may be any type of device sufficient for controlling a drone 120 including, but not limited to, a laptop computer, a smartphone, a tablet computer, a smartwatch, smart glasses, a drone remote controller, and so forth.

In a further example embodiment, the driver 170 may have a computing device 180. The computing device 180 of the driver 170 may include a laptop computer, a smartphone, a tablet computer, a smartwatch, smart glasses, a drone remote controller and so forth. The computing device 180 may be configured to control the drone 120. In an example embodiment, the determination as to whether a control over the drone 120 needs to the transferred to the user device 160 of the customer 150 may be performed by the computing device 180 of the driver 170 instead of the in-vehicle computing device 140.

At time position 176, the drone 120 may be disconnected from the vehicle 110 and launched by the in-vehicle computing device 140. In another example embodiment, the drone 120 may be launched by the driver 170 using the computing device 180. Upon launch, the in-vehicle computing device 140 or the driver 170, via the computing device 180, may transfer control over the drone 120 to the user device 160 of the customer 150. For example, the in-vehicle computing device 140 or the computing device 180 of the driver 170 may send a request to the user device 160 to accept control over the drone 120. Upon accepting control of the drone 120 by the customer 150 using the user device 160, the customer 150 may use the user device 160 to navigate the drone 120 to a destination 165 associated with the customer 150. Upon arrival of the drone 120 to the destination 165, the customer 150 may take an item 130 carried by the drone 120.

At time position 178, after the item 130 is released to the customer 150, the in-vehicle computing device 140 or the computing device 180 of the driver 170 may take control over the drone 120 back from the user device 160. The in-vehicle control device 140 or the computing device 180 of the driver 170 may navigate the drone 120 back from the destination 165 to the vehicle 110 and mount the drone 120 on the vehicle 110.

In an alternative example embodiment, at time position 174, the in-vehicle computing device 140 may determine that control over the drone 120 needs to the transferred to the computing device 180 of the driver 170. Upon such determination, the in-vehicle computing device 140 may hand over the control to the computing device 180 of the driver 170. The driver 170 may use the computing device 180 to navigate the drone 120 to the customer 150 at time position 176. Upon releasing the item 130 at the destination 165, the driver 170 may use the computing device 180 to navigate the drone 120 back to the vehicle 110 at time position 178. In an example embodiment, upon arrival of the drone 120 to the vehicle 110, the control over the drone 120 may be transferred from the computing device 180 to the in-vehicle computing device 140.

Figure 2:
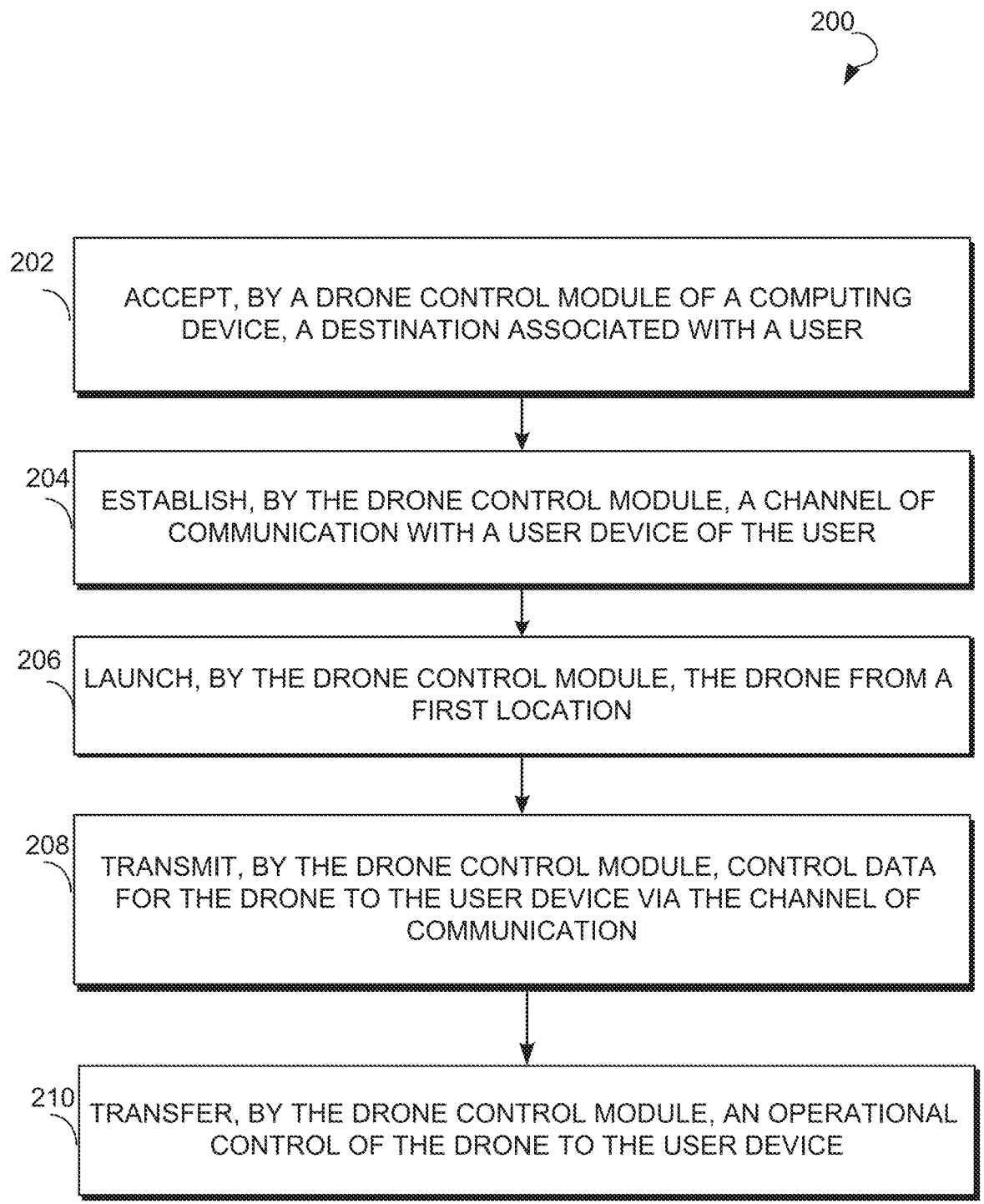
FIG. 2 is an example process flow for a method of transferring control of the operation of a drone from a first device to a second device, in accordance with one or more example embodiments of the disclosure.

FIG. 2 is an example process flow for a method 200 for transferring control of the operation of a drone from a first device to a second device, in accordance with one or more example embodiments of the disclosure. In some example embodiments, the operations may be combined, performed in parallel, or performed in a different order. The method 200 may also include additional or fewer operations than those illustrated. The method 200 may be performed by processing logic that may comprise hardware (e.g., decision making logic, dedicated logic, programmable logic, and microcode), software (such as software run on a general-purpose computer system or a dedicated machine), or a combination of both.

Now referring to FIGS. 1 and 2, the method 200 may include accepting, by a drone control module of a computing device, a destination associated with a user at block 202. In one example, the user may be a customer 150 to which an item 130 needs to be delivered. In an example embodiment, the computing device may include an in-vehicle computing device 140 associated with the vehicle 110 or a second user computing device, such as a computing device 180 of a driver 170 of the vehicle 110.

The method 200 may continue with establishing, by the drone control module, a channel of communication with a user device 160 of the user 150 at block 204. At block 206, the drone 130 can be launched by the drone control module of the in-vehicle computer 140 from a first location. In one example, the first location is on or within the vehicle 110. In another example embodiment, the first location may be along the ground near the vehicle, such as in situations where the vehicle 110 is covered by buildings, lighting, a tree canopy or other obstructions to the potential path of the drone 120.

At block 208, drone control module may transmit control data for the drone 120 to the user device 160 via a channel of communication between the in-vehicle computer 140 and the user device 160. At block 210, the drone control module may transfer operational control of the drone 120 to the user device 150. The operations 202-210 of the method 200 are described in further detail with reference to FIGS. 3A-3E.

FIGS. 3A-3E illustrate an example process flow for a method 300 for the transfer of drone control during flight and for an automated drone delivery to a previously visited destination, in accordance with one or more example embodiments of the disclosure. The method 300 may be implemented using an in-vehicle computing device 140 associated with a vehicle 110, a user device 160 associated with a customer 150, a computing device 180 associated with a driver 170, and a server/computing cloud 125.

Referring now to FIGS. 1 and 3A-4, the customer 150 may be previously informed of the delivery day and time by a delivery vehicle 110 carrying a drone 120 and a package 130. The customer 150 may be notified, for example, by a delivery service, about the package delivery by the drone 120 to the customer 150. For example, a request to confirm the willingness of the customer 150 to accept the delivery of the item 130 by a drone 120 on a predetermined day/time may be transmitted to the customer 150 at block 302. In one example, the request may be transmitted to and received by the customer user device 160.

At block 304, a response may be received from the customer 150. In one example, the customer 150 can transmit a response to the server 125 via the customer user device 160. At block 306, it may be determined whether the customer 150 has agreed to accept the package delivery by the drone 120. In one example, the determination can be made by the server/computing cloud 125. If the customer 150 has not agreed to the package delivery by drone 120 on the particular day and time, the NO branch can be followed to block 308, where the timing of the package delivery may be rescheduled. In one example, the rescheduling operation can be conducted by the server 125.

If the customer 150 confirmed that they are willing to accept the delivery by drone 120 on the predetermined day and time, the YES branch is followed to block 310, where the delivery vehicle 110 can transport the drone 120 and the item 130 to be delivered to the customer 150 to a launch area within a predetermined distance from or in vicinity of the destination 165, i.e. a delivery address of the customer. In one example embodiment, the predetermined distance is less than one mile and preferably less than one-half mile, and more preferably less than one-quarter mile, and even more preferably less than one block from the destination.

The delivery vehicle 110 may have an in-vehicle computing device 140. Upon arrival of the delivery vehicle 110 to the launch area, at block 312, the in-vehicle computing device 140 may evaluate a customer profile 560 in a customer database. For example, the in-vehicle computing device 140 can communicate with the server 125 to retrieve or access the customer profile of the customer 150 from a database of customer profiles 560 at the server 125. Each customer profile can be associated with a single customer or postal address and can include, but is not limited to, customer name, customer address, customer phone number, customer email address, purchase history of the customer, delivery history of the customer, a picture of the customer's face, one or more pictures of the destination for delivering packages by drone for the customer, the customers ability to control one or more specific types of drones, and an identification of the user device 160.

At block 314, based on data in the customer profile 560 for the customer 150, the in-vehicle computing device 140 or the server 125 may determine whether the customer 150 has previously received deliveries by a drone to the same delivery destination 165 associated with the customer 150. If it is determined that the customer 150 has not previously received delivery by a drone, the NO branch is followed to block 320 of FIG. 3B. On the other hand, if it is determined that the customer 150 has previously received delivery by a drone, the YES branch is followed to block 402 and FIG. 3E.

Figure 3A:
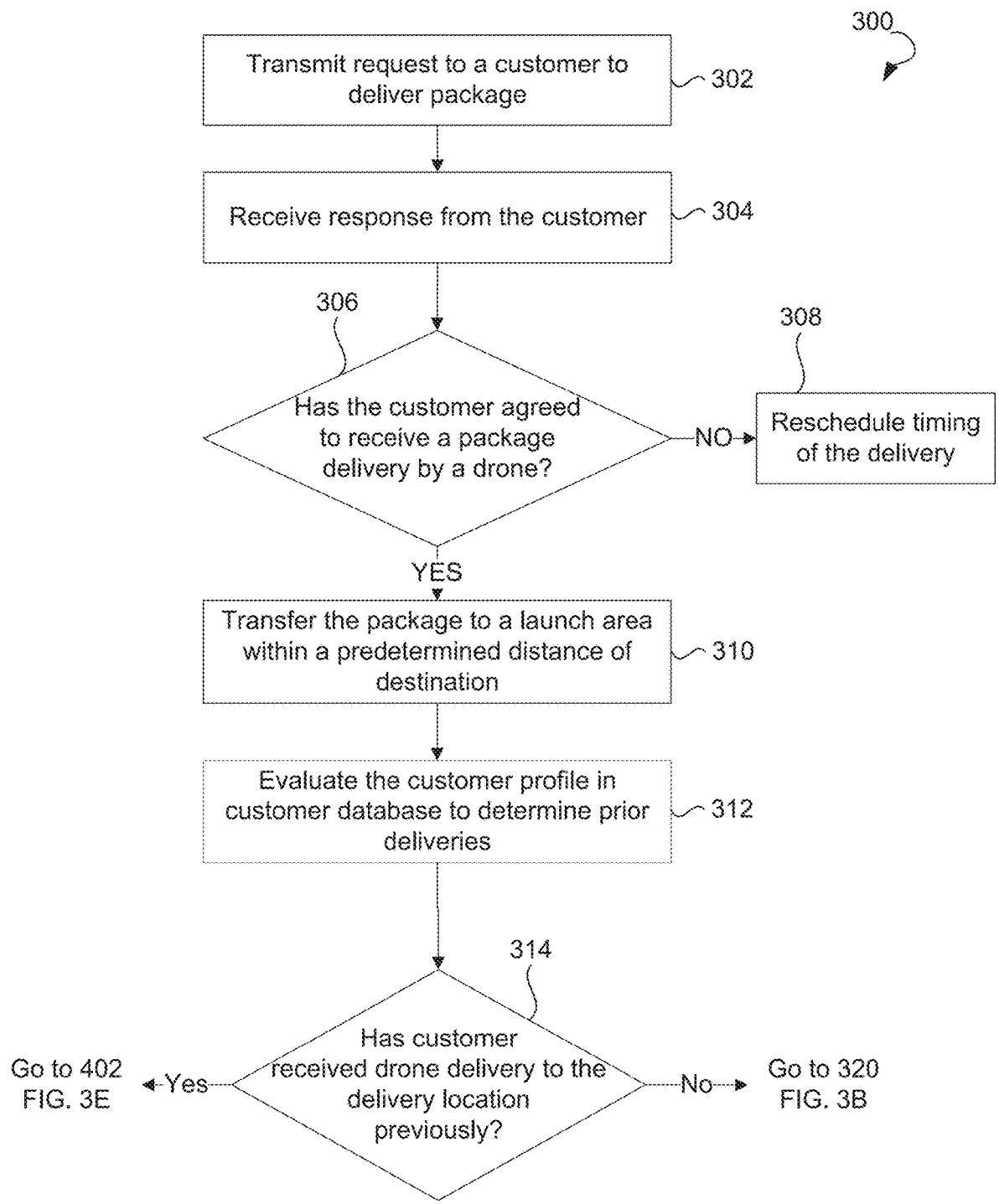
FIGS. 3A-3E illustrate an example process flow for a method for the transfer of drone control during flight and for an automated drone delivery to a previously visited destination, in accordance with one or more example embodiments of the disclosure.
Figure 3B:
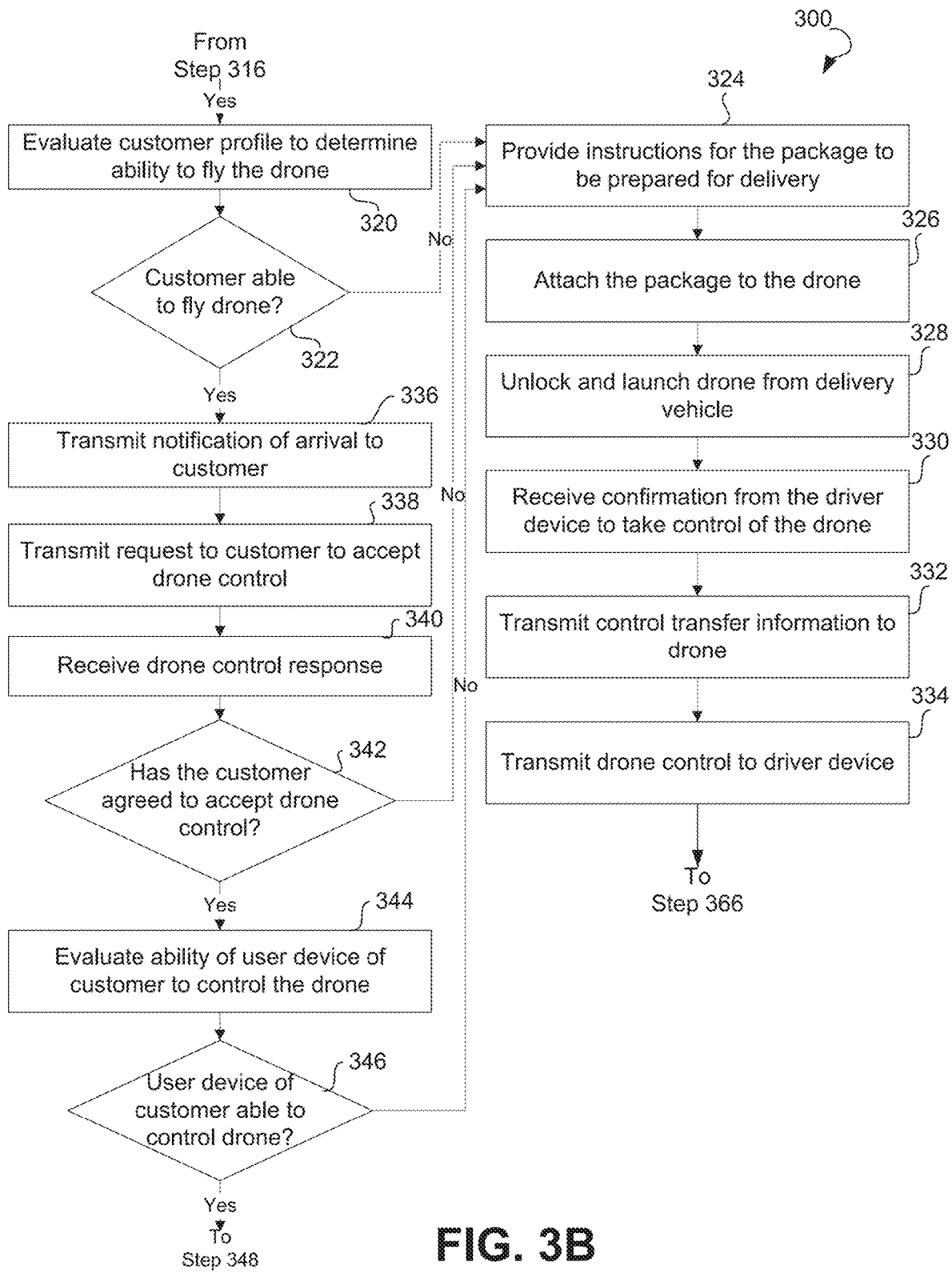
Figure 3C:
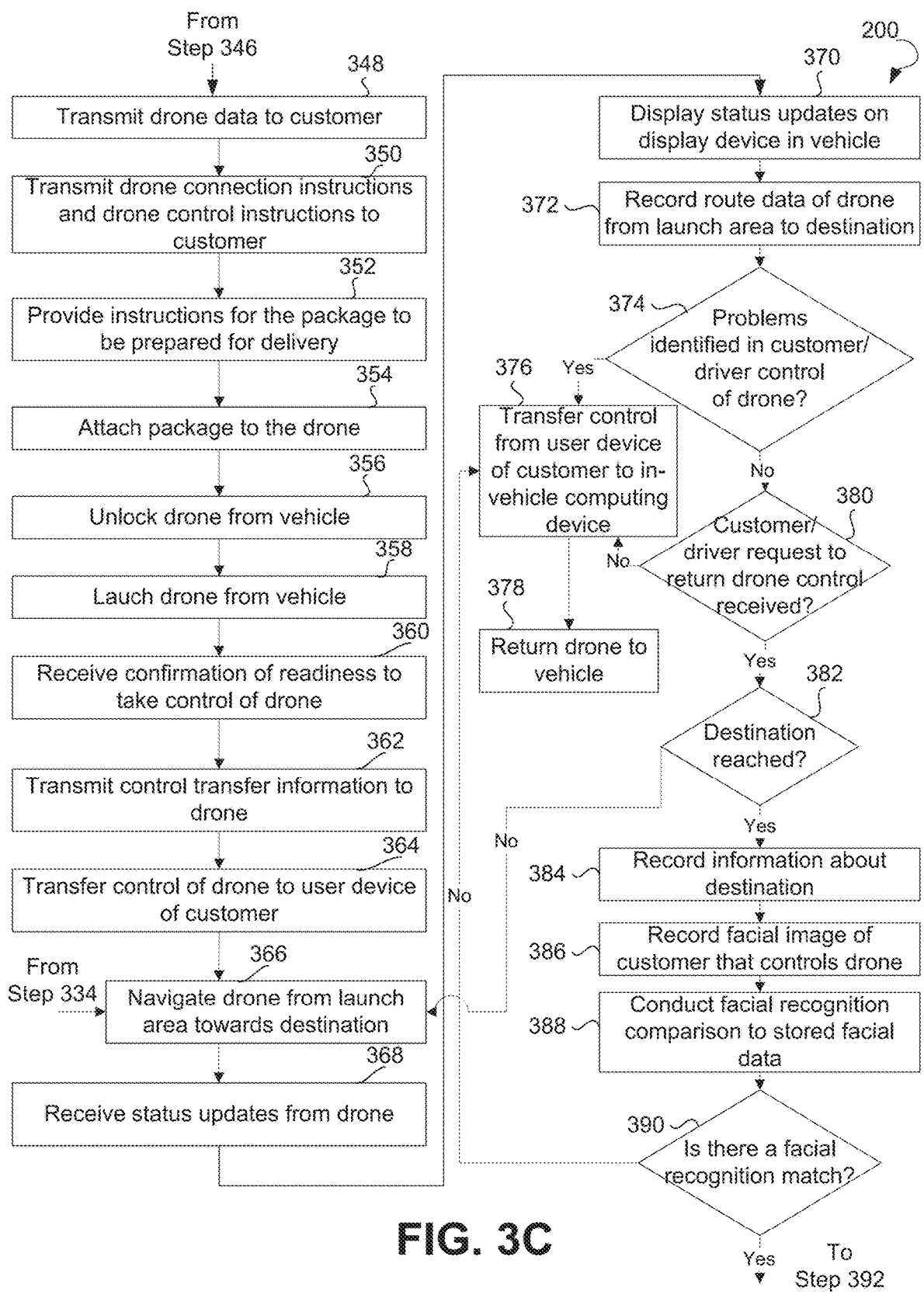
Figure 3D:
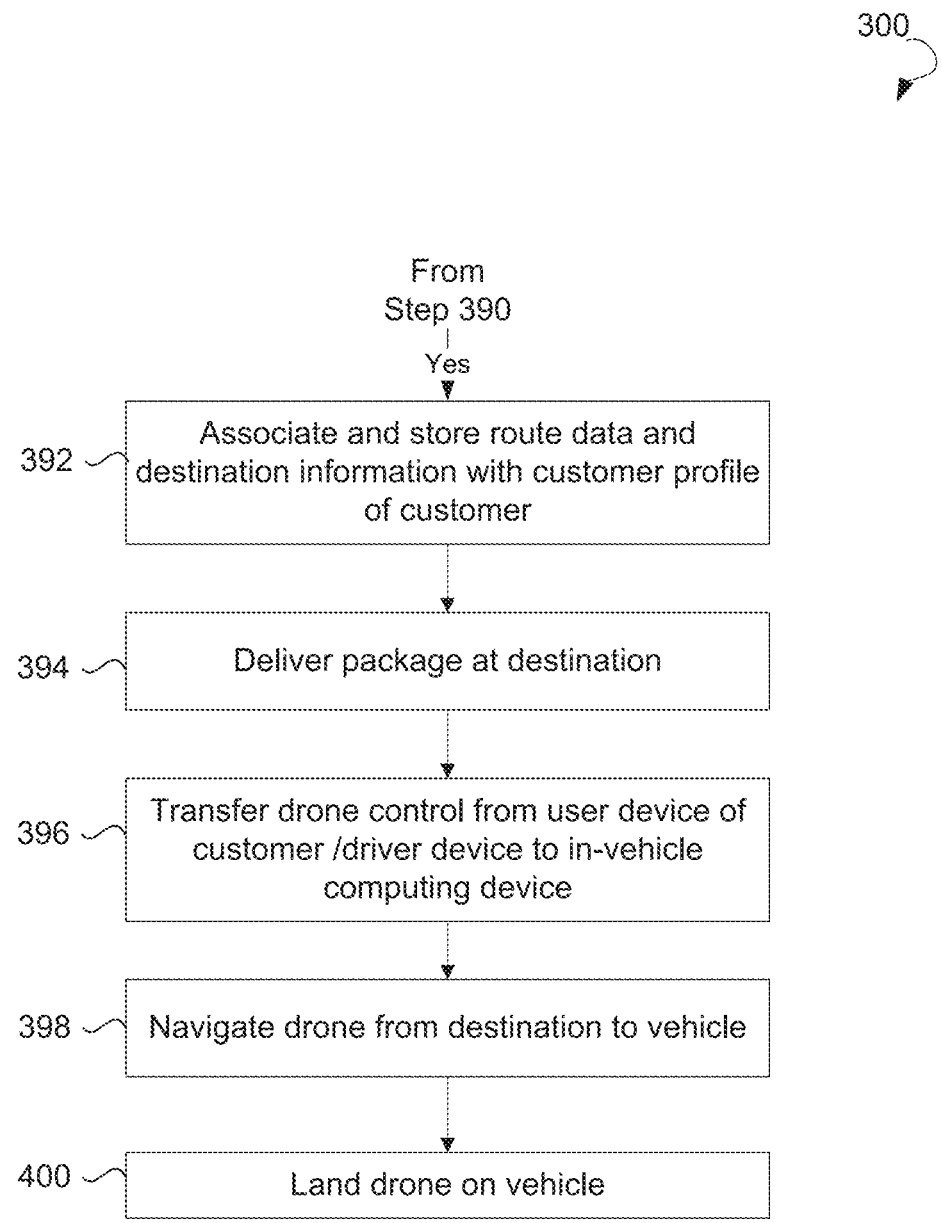
Figure 3E:
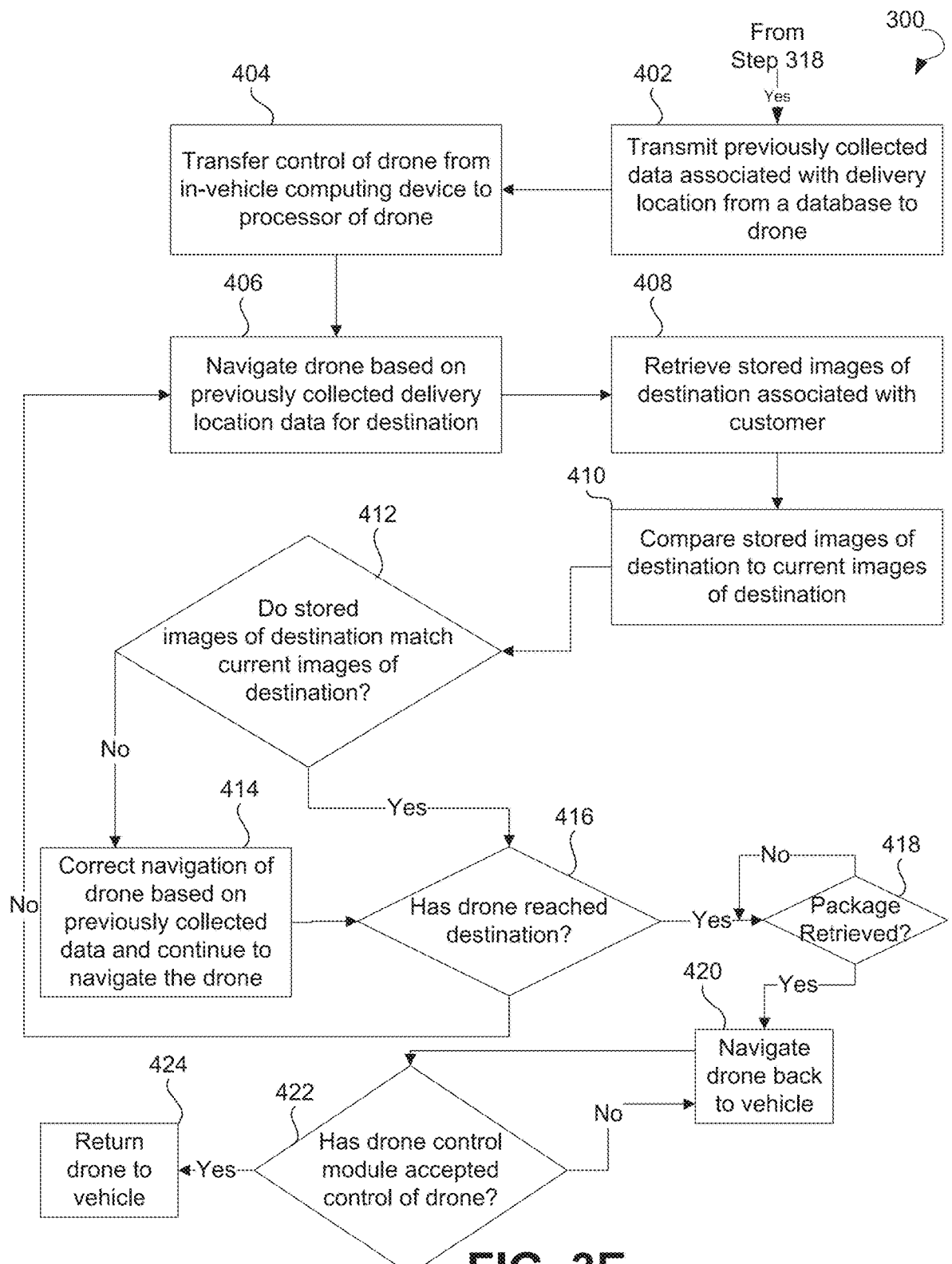

At block 320 of FIG. 3B, the in-vehicle computing device 140 or server 125 may evaluate the customer profile to determine an ability or skill level of the customer 150 to fly the drone 120. For example, at block 322, the in-vehicle computing device 140 or server 125 may access user data of the customer 150 stored in the customer profile 550 in the database of the server 125 to determine, based on the user data, whether the customer 150 is able to control the drone 120. For example, the user data may include information as to whether the customer has flown this type of drone before and/or any safety or control issues that the customer 150 has previously had with regard to controlling this type of drone 120 before. If it is determined that the customer 150 is not able to control the drone 120, the NO branch is followed to block 324, where the in-vehicle computer 140 generates an instruction to prepare a package 130 for delivery. In one example embodiment, the instruction is provided by the in-vehicle computing device 140 to a driver 170 of the delivery vehicle 110 or to a person associated with the delivery service. In another example embodiment, the instruction is provided by the in-vehicle computing device 140 to an automated package loader (not shown) that may be part of the vehicle 110 and configured to select and attach packages and other items to the drone 120. The drone 110 may be configured to deliver one or more items, e.g., packages, to the destination 165. At block 326, the package 130 may be attached to the drone 110 (e.g., by the driver 170 or the person associated with the delivery service or by way of the automated package loader).

At block 328, the drone 120 may be unlocked and launched from the delivery vehicle 110. In one example, the in-vehicle computing device 110 controls a locking mechanism of the vehicle 110 to unlock the drone 120 and controls the drone 120 through the initial launch from the vehicle 110. At block 330, the in-vehicle computing device 140 may receive a confirmation that the driver 170 is ready to take control of the drone 120. In one example, the confirmation can be transmitted from the driver user device 180 to the in-vehicle computing device 140. In another example embodiment where the in-vehicle computing device 140 is a mobile device that may be removed from the vehicle 110, the in-vehicle computing device 140 may be the driver user device 180 and the driver may simply provide a user input at the in-vehicle computing device 140 to signal to the in-vehicle computing device that the driver 170 is ready to control the drone 120.

The drone control transfer information may be transmitted to the drone 120 at block 332. In one example, the drone control transfer information can be transmitted from the in-vehicle computing device 140 to the drone 120 The drone control transfer information can include an identification of the driver user device 180 and any limits on the control rights for the driver 170 when operating the drone 120. Control rights can include a range that the drone 120 can be controlled within, an amount of time the drone 120 can be controlled, the types of controls that drone will accept (e.g., to maintain safe flight characteristics for the drone 120, etc.). At block 334, control of the drone may be transmitted or transferred to the driver device 180. The process may then continue to block 366 in FIG. 3C.

Returning to the determination at block 322, if it is determined that the customer is able to control the drone, then the YES branch is followed to block 336, wherein the in-vehicle computing device 140 may transmit a notification of arrival to the customer 150. In one example, the notification of arrival may be transmitted from the in-vehicle computing device 140 to the customer user device 160 via a network 565. At block 338, the in-vehicle computing device 110 may transmit a request to the user device 160 of the customer to accept control of the drone 120. The user device 160 may be configured to enable the customer 150 to guide the drone to the destination 165 via a human-machine interface (HMI) of the user device 160. The HMI may be associated with a mobile application running on the user device 160 and may be configured to take inputs from the customer 150 to take control over the drone 120 and operate the drone 120. In another example embodiment, the user device 160 can be a remote controller that is general in configuration or specifically designed to control drone flight. At block 340, the in-vehicle computing device 140 may receive a response from the customer 150. In one example, the response is transmitted from the user device 160 to the in-vehicle computing device 140 via the network 565. At block 342, the in-vehicle computing device 110 may evaluate the response to determine whether the customer 150 has agreed to accept control over the drone 120.

If the customer 150 does not agree to accept control over the drone 120, the NO branch is followed to block 324 discussed above. Specifically, if the customer 150 has indicated that the customer 150 is unwilling to accept control of the drone 120, the control of the drone 120 may be transferred to the person associated with the delivery system, such as the driver 170 of the vehicle 110 or a drone operator associated with the vehicle 110. The in-vehicle computing device 140 may determine whether the control of the drone 120 has been transferred to the driver 170. If the driver 170 has not taken the control over the drone 120 yet, the in-vehicle computing device 140 may keep determining whether the control was transferred to the computing device 180 of the driver. If the driver 170 has taken the control over the drone 120, the driver 170 may navigate the drone 120 using the computing device 180 of the driver, as shown by block 366 on FIG. 3C. When flying, the drone 120 may learn how to reach to the destination 165 and store the learnt route data, all drone sensor and camera data, and other information into the server/computing cloud 125 for further autonomous drone delivery to the same destination 165 of the customer 150. When the drone 120 is at the destination 165, the customer 150 may retrieve the package 130 from the drone 120.

Returning to the determination at block 342, if the customer 150 has agreed to accept control over the drone 120 via the user device 160 of the customer, the YES branch is followed to block 344, where the in-vehicle computing device 140 may evaluate the technical capability of the user device 160 of the customer to control the drone 120. For example, at block 346, the in-vehicle computing device 140 may communicate with a mobile application running on the user device 160 and associated with the delivery service to determine if specific control requirements and/or communication speed is available on the user device 160 and accessible by the customer 150 when controlling the drone 120. If in-vehicle computing device 140 determines that the user device 160 of the customer 150 is not able to control the drone 120, the NO branch is followed to block 324 as discussed above. If the in-vehicle computing device determines that the user device 160 of the customer 150 is able to control the drone 120, then the YES branch is followed to block 348 of FIG. 3C.

At block 348, drone data may be transmitted to the user device 160 of the customer 150. In one example, the drone data can be retrieved by the in-vehicle computing device 140 and transmitted from the device 140 to the user device 160 via the network 565 At block 350, control data for the drone 120, such as drone connection instructions and drone control instructions, may be transmitted to the user device 160 of the customer 150. In an example embodiment, the control data for the drone may transmitted to the user device 160 in response to the receiving, from the user device 160 or another communication means of the customer, the acceptance of the request to control the drone 120. In one example embodiment, the drone data, drone connection instructions, and drone control instructions may be transmitted from the in-vehicle computing device 140 to the user device 160 in an encrypted form. The instructions may be sent from the user device 160 to the drone 120 based on the Internet Protocol (IP) address of the drone, a Media Access Control (MAC) address of the drone 120, a manufacturer identifier of the drone 120, and the like. For example, the instructions may be sent to or from the user device 160 in the following form:

<IP Address>:<Port Number>/RemoteAPI/drone/command/<Command Name>

192.168.1.20:10201/RemoteAPI/drone/command/GoRight 192.168.1.20:10201/RemoteAPI/drone/command/GoUp At block 352, the in-vehicle computer 140 generates an instruction to prepare a package 130 for delivery. In one example embodiment, the instruction is provided by the in-vehicle computing device 140 to a driver 170 of the delivery vehicle 110 or to a person associated with the delivery service. In another example embodiment, the instruction is provided by the in-vehicle computing device 140 to an automated package loader (not shown) that may be part of the vehicle 110 and configured to select and attach packages and other items to the drone 120. At block 354, the package 130 may be attached to the drone 110 (e.g., by the driver 170 or the person associated with the delivery service or by way of the automated package loader).

At block 356, the drone 120 may be physically unlocked from the vehicle 110 and set to launch. In one example, the drone 120 is unlocked manually by the driver 180. In another example embodiment, the in-vehicle computing device 140 generates and transmits a signal to the vehicle 110 to release a locking mechanism on the vehicle 110 that is locking the drone 120 in place. At block 358, the drone 120 can be launched from the vehicle 110 or from the ground near the vehicle 110. In one example embodiment, the in-vehicle computing device controls the operations of the drone 120 during the launch phase. Launching of the drone 120 may be performed in a vertical direction, such as out of a roof of the delivery vehicle 110, or from a flat bed of a truck or from the generally flat area of ground near the vehicle 110. The in-vehicle computing device 140 may additionally control functions of the vehicle 110 to enable the drone 120 to be launched.

Upon launching the drone 120, at block 360, the in-vehicle computing device 140 may receive the confirmation of readiness of the customer 150 to take control of drone 120. In one example, the confirmation is transmitted from the user device 160 to the in-vehicle computing device 140 via the network 565. At block 362, the in-vehicle computing device 140 may transmit the control transfer information to the drone 120 to notify the drone 120 that the control is transferred to the user device 160. In one example, the control transfer information can include an identification of the user device 160 and any limits on the control rights for the customer 150 when operating the drone 120. Control rights can include a range that the drone 120 can be controlled within, an amount of time the drone 120 can be controlled by the customer 150, the types of controls that drone will accept from the customer 150 via the user device 160 (e.g., to maintain safe flight characteristics for the drone 120, etc.). With this setup of the drone 120, no other device may be able to operate the drone 120 except the user device 160 and the in-vehicle computing device 140.

At block 364, the in-vehicle computing device 140 may transfer the operational control of the drone 120 to the user device 160 of the customer 150. In one example, the in-vehicle computing device 140 may determine whether the control of the drone 120 was transferred to the user device 160 of the customer 150. If the customer 150 has not taken the control over the drone 120 yet, the in-vehicle computing device 140 may keep determining whether the control was transferred to the user device 160. If the customer 150 has taken the control over the drone 120, the customer may navigate the drone 120 using the user device 160 from the launch area towards the destination 165 in block 366. For example, the customer 150 may take control of the drone 120 via the user device 160 and start to direct the drone 120 to a desired spot to allow retrieval of the package 130 from the drone 120 by the customer 150. As the drone 120 is being controlled from the launch area to the destination 165, the drone 120 may learn how to reach to the destination 165 associated with the address of the customer 150 and can store the learnt route, all drone sensor and camera data and other information in the customer profile 522 or the drone and/or the customer profile 560 for the customer at the server/computing cloud 125 for subsequent autonomous drone delivery to the same address of the customer 150.

In an example embodiment, the in-vehicle computing device 140 can mediate the commands and controls between the user device 160 and the drone 120 instead of transferring full control to the user device 160. Specifically, the drone 120 may always take commands from the in-vehicle computing device 140 only. In this case, the operational control of the drone 120 to the user device 160 may be performed by receiving, by the drone control module 542 of the in-vehicle computing device 140, drone control commands from the user device 160 and transmitting, by the in-vehicle computing device 140, the drone control commands to the drone 120. The drone control commands may be directed to controlling of operational parameters of the drone 120. If necessary, the in-vehicle computing device 140 may closely monitor the commands of the customer 150 and verify and/or filter commands received from the user device 160 to maintain safe operation of the drone 120.

At block 368, the in-vehicle computing device 140 may receive status updates from the drone 120. For example, the status updates can include global positioning system (GPS) coordinates from the location services module 524, telemetry data (e.g., altitude, speed, range, battery life) from the sensors 528, and live-stream video or pictures from the camera 532. The status updates may be displayed on a display associated with the vehicle at block 370. As such, the in-vehicle computing device 140 may keep monitoring the status and the operation of the drone 120.

When flying, the drone 120 may continuously collect routing data related to the route of the drone from the launch area to the destination 165. At block 372, the routing data of a route of the drone 120 from the launch area to the destination 165 may be recorded and stored to the database to enable future autonomous flights of the same drone or any other compatible drone to the same destination 165. For example, the routing data can be stored and associated with the customer profile 522 at the drone 120 and/or the customer profile for the customer 150 in the customer profiles module 560 of the server 125. The routing data may include a global positioning system (GPS) location of the drone, an altitude of the drone, a picture of the destination 165, a video of the destination 165, pictures/video captured by a camera of the drone during the flight, and so forth.

In some example embodiments, a predetermined number of deliveries by the drone 120 to the same destination may be needed to collect sufficient routing data to allow for switching the drone 120 into an autonomous delivery mode during subsequent deliveries. Machine learning algorithms may be used by the server 125 to analyze the routing data and select or generate an optimal route for the drone 120 based on the stored routing data of several deliveries to the same destination.

As the drone 120 is being routed from the launch area to the destination, in certain examples, the in-vehicle computing device 140 may not control the drone 120, but may take over operation of the drone 120 if emergency conditions are detected. Examples of emergency conditions that may be detected by the in-vehicle computing device 140 can include, but are not limited to, a request of the customer 150 to transfer the operational control of the drone 120 to the in-vehicle computing device 140, mishandling the drone 120 by the customer 150, and/or when a camera 532 of the drone 120 identifies predefined situations or conditions in which it is recommended that control of the drone 120 revert back to the in-vehicle computing device 140 (e.g., excessive tilting, too close to the building façade, too close to the ground, too high of an altitude, excessive altitude changes, etc.). For example, the in-vehicle computing device 140 may determine that a predetermined emergency condition occurred at the drone 120 while the drone 120 is under the operational control of the user device 160. Based on the determination of the occurrence of the predetermined emergency condition, the in-vehicle computing device 140 may transfer the operational control of the drone 120 from the user device 160 to the drone control module 526 of the in-vehicle computing device 140.

At block 374, the in-vehicle computing device 140 determines whether any problems are identified in the control of the drone 120 by the customer 150 or the driver 170. Problems can include the predetermined emergency conditions described above. If the problems are identified, the YES branch is followed to block 376, where control of the drone 120 is automatically transferred from the user device 160 of the customer 150 or the computing device 180 of the driver 170 to the in-vehicle computing device 140. At block 378, the drone 120 may be returned to the vehicle 120 and/or launch area under the control of the in-vehicle computing device 140.

Returning to the determination of block 374, if no problems are identified by the in-vehicle computing device 140, the NO branch is followed to block 380, where a determination is made as to whether a request has been received from the customer 150 via the user device 160 or the driver 170 via the driver user device 180 to return drone control to the in-vehicle computing device 140. In one example, the request can be received by the in-vehicle computing device 140 from the user device 160 or the driver user device 180 via the network 565. If no customer request/driver request is received by the in-vehicle computing device 140, the No branch can be followed to block 376 as described above. On the other hand, if a customer request/driver request to return control of the drone 120 to the in-vehicle computing device 140 is received, the YES branch is followed to block 382, where the in-vehicle computing device 140 may determine whether the destination 165 for delivery of the item 130 has been reached by the drone 120. If the destination 165 has not been reached, the NO branch can be followed to block 366 as described above. If the in-vehicle computing device 140 determines that the destination 165 has been reached by the drone 120, the YES branch can be followed to block 384, where the drone 120 can record information about the destination 165. In one example embodiment, the information about the destination 165 can include, but is not limited to, the address of the destination, the GPS coordinates of the destination, a photo of the destination, a video of the destination, and an altitude of the destination. In certain example embodiments, the information about the destination 165 can be stored in the customer profile module 522 of the drone 120 and/or the customer profiles module 560 of the server 125.

At block 386, the drone 120 may use the camera 532 that is attached to or incorporated into the drone 120 to capture a facial image of the customer 150 that currently controls the drone 120. At block 388, a facial recognition comparison of the facial image of the customer 150 with stored facial data associated with the customer 150 is conducted. In one example, the facial recognition comparison is completed by the processor 516 of the drone 120. Alternatively, the facial image can be transmitted to the in-vehicle computing device 140 or the server 125 for conducting the facial recognition comparison at the device 140 or the server 125. At block 390, a determination as to whether the facial image of the customer 120 matches the stored facial data in the customer profile for the customer 150 is performed. In certain example embodiments, the determination can be made by the processor 516 of the drone 120, the processor 534 of the in-vehicle computing device 140 and/or the processor 550 of the server 125. If the facial image of the customer 120 collected by the drone camera 532 does not match the stored facial data in the customer profile of the customer 150, the NO branch is followed to block 376 as described above. If the facial image of the customer 120 collected by the drone camera 532 does match the stored facial data in the customer profile of the customer 150 within a preset threshold, the YES branch is followed to block 392 of FIG. 3D.

In block 392, the routing data for the drone 120 from the launch area to the destination 165 and the destination information may be associated with the customer profile of the customer 150 and stored to the database. In one example, the routing data and the destination information can be stored in the profile associated with the customer 150 in the customer profile 522 of the drone 120 and/or the customer profiles 560 of the server 125. At block 394, the drone 120 can deliver the package 130 to the destination 165. For example, the drone 120 can lower the package 130 down to the customer 130 via a tether and can release the package 130 on the floor of the destination or into the hands of the customer 150. In another example, the drone 120 can land at the destination 165 and the customer 150 can retrieve the package 130 from the drone 120.

In one example, the in-vehicle computing device 140 may determine whether the package 130 has been already retrieved by the customer 150 from the drone 120. If the package 130 has not been retrieved yet, the in-vehicle computing device 120 may keep tracking whether the customer 150 retrieved the package from the drone 120. Once the package 130 has been received by the customer 150, the in-vehicle computing device 140 may trigger a mechanism of transferring the control over the drone 120 from the user device 160 of the customer 150 or the driver user device 180 of the driver 170 back to the in-vehicle computing device 140 at block 396. The in-vehicle computing device 140 may then control the drone 120 as the drone 120 returns from the destination 165 to the launch site and/or the vehicle 110 in block 398. If the control has not been transferred yet, the customer 150 or the driver 170 may start navigating the drone 120 back to the launch site and/or the vehicle 110. In some example embodiments, in situations where the route back to the launch site or vehicle 110 is tricky or difficult, the in-vehicle computing device 140 may instruct a processor 516 of the drone 120 to navigate the drone 120 near the delivery vehicle 110 so that it makes it easy to land the drone 120 safely. At block 400, the drone may be landed at the vehicle or the launch site under the control of the in-vehicle computing device 140.

Returning to the determination of block 314 in FIG. 3A, on a first time delivery or for a predetermined number of deliveries to the delivery address of the customer 150, the drone 120 collects details about the destination 165 and the route to the destination 165 when the customer 150 or the driver 170 operates the drone to the destination 165. For example, the drone 120 captures details of the delivery route from the vehicle 110 and/or launch site to the destination 165, including, but not limited to, sensor data from the sensors 528 (e.g., altitude), camera data (e.g. either still photos or video) from the camera 532, and GPS location from the location services module 524, and stores the collected details and route data in a customer profile 560 for the customer 150 in the server 125. The database may store a customer profile for the customer and all data collected by the drone 120 may be stored to the customer profile 560. Additionally, the data collected by the drone 120 may be used in case of drone delivery accidents to analyze the reasons and details of the accidents and verify that the accident is not caused by the customer 150.

If it is determined that the customer 150 has previously received delivery by a drone 120 or a predetermined number of deliveries by a drone 120 under control of one or more of the driver 170 or the customer 150, the YES branch is followed to block 402, where the in-vehicle computing device 140 retrieves the routing data and destination information associated with the destination and the customer profile of the customer 150, including the stored photo of the customer 150 from the customer profiles 560 of a database of the server 125. Based on the routing data, the in-vehicle computing device 140 instructs the drone 120 to autonomously fly from the vehicle 110 and/or launch site to the destination 165. For example, at block 402, previously collected data of the delivery to the destination 165 may be transmitted from the customer profiles database 560 to the drone 120 via the network 565.

At block 404, control of the drone 120 may be transferred from the drone control module 542 of the in-vehicle computing device 140 to a processor 516 of the drone 120. Therefore, as this is not the first time the drone delivers the package to the same destination address of the customer 150, the drone 120 may employ autonomous control methodologies to self direct the drone 120 to the destination 165 autonomously based on the stored information of the route and destination 165 collected and stored during the previous deliveries to the destination 165. At block 406, the processor 516 of the drone 120 may employ its sensors 528 and GPS via the location services module 524 to navigate the drone 120 from the vehicle 110 and/or launch site (in case the launch site is not from on or within the vehicle but away from the vehicle 110) based on the previously collected routing data and destination information for the destination 165 associated with the customer 150. For example, the drone 120 may follow or substantially follow the same GPS coordinates to reach the destination 165 associated with the customer 150. Additionally, the drone 120 may use the camera 532 to capture a current image and/or current video of the destination 165. At block 408, the drone 120 may retrieve stored images and/or video of the destination 165 of the customer 150 from the customer profile 522 in memory 518.

At block 410, the processor 516 of the drone 120 may compare the images and/or video retrieved from the customer profile 522 for the customer 150 with the current image and/or video of the destination 165 captured by the camera 532 of the drone 120 to determine if a match exists within a predetermined threshold. At block 412, the processor 516 of the drone 120 may determine whether the stored images and/or video match the current images and/or video of the destination 165 within a predetermined threshold. If the images and/or video do not match within a predetermined threshold, the NO branch can be followed to block 414, where the processor 516 of the drone 120 may correct the navigation of the drone 120 and/or continue moving the drone 120 towards the destination. The navigation of the drone 120 may be corrected based on previously collected routing data and/or destination data. Upon the correction, the processor 516 of the drone 120 may continue the autonomous navigation of the drone 120.

If the images and/or video collected by the camera 532 during this delivery match the images and/or video retrieved from the customer profile 522 within a predetermined threshold, the YES branch can be followed to block 416, where the processor 516 of the drone 120 determine if the destination 165 has been reached. In one example, the processor 516 can determine that the destination 165 has been reached by a positive identification of the destination in block 412 and a determination, based on the route data that the route to the destination has been completed. If the processor 516 determines that the drone 120 has not yet reached the destination 165, the NO branch can be followed back to block 406. If the processor 516 determines that the drone 120 has reached the destination 165, the YES branch can be followed to block 418. Upon reaching the destination 165, the drone 120 may conduct facial recognition matching of the customer 150 in substantially the same manner as described above.

Upon reaching the destination 165, the drone can deliver the package 130 to the customer 150 or leave the package 130 at the destination 165 for the customer 150. For example, the drone 120 may lower the package 130 from the drone 120 to the customer 150 via a tether, rope, or the like and release the package to the customer 150 or at the destination 165 associated with the customer 150. Landing of the drone 120 at the destination 165 in order to deliver the package 130 may not be necessary. The image and/or video matching may happen continuously for a certain time until the match of the current images and/or video and pre-stored images and/or video is found or a threshold for a condition to return to the vehicle 110 is reached.

At block 418 a determination can be made by the processor 516 of the drone 120 as to whether the package 130 has been released by the drone 120 or otherwise retrieved by the customer 150 from the drone 120. If the package has not been retrieved yet, the NO branch may be followed back to block 418 to continuously monitor the status of package retrieval. If the processor 516 determines that the package 130 has been retrieved or delivered by the drone 120, the YES branch can be followed to block 420.

At block 420, the processor 516 of the drone 120 may navigate the drone 120 from the destination 165 back to the vehicle and/or launch site. Additionally, the processor 516 of the drone 120 or the processor 534 of the in-vehicle computing device 140 may trigger a mechanism of transferring control over the drone 120 from the drone 120 back to the in-vehicle computing device 140 for landing and securing of the drone in, on, or near the vehicle 110. At block 422, the processor 516 of the drone 120 may determine whether control over operation of the drone 120 has been transferred to the in-vehicle computing device 140. If control has not been transferred yet, the NO branch is followed back to block 420 as described above. If control has been transferred from the drone 120 to the in-vehicle computing device 140, the YES branch may be followed to block 424, where the in-vehicle computing device 140 may navigate the drone 120 to safely land the drone 120 and secure the drone on, in, or near the vehicle 110.

Figure 4:
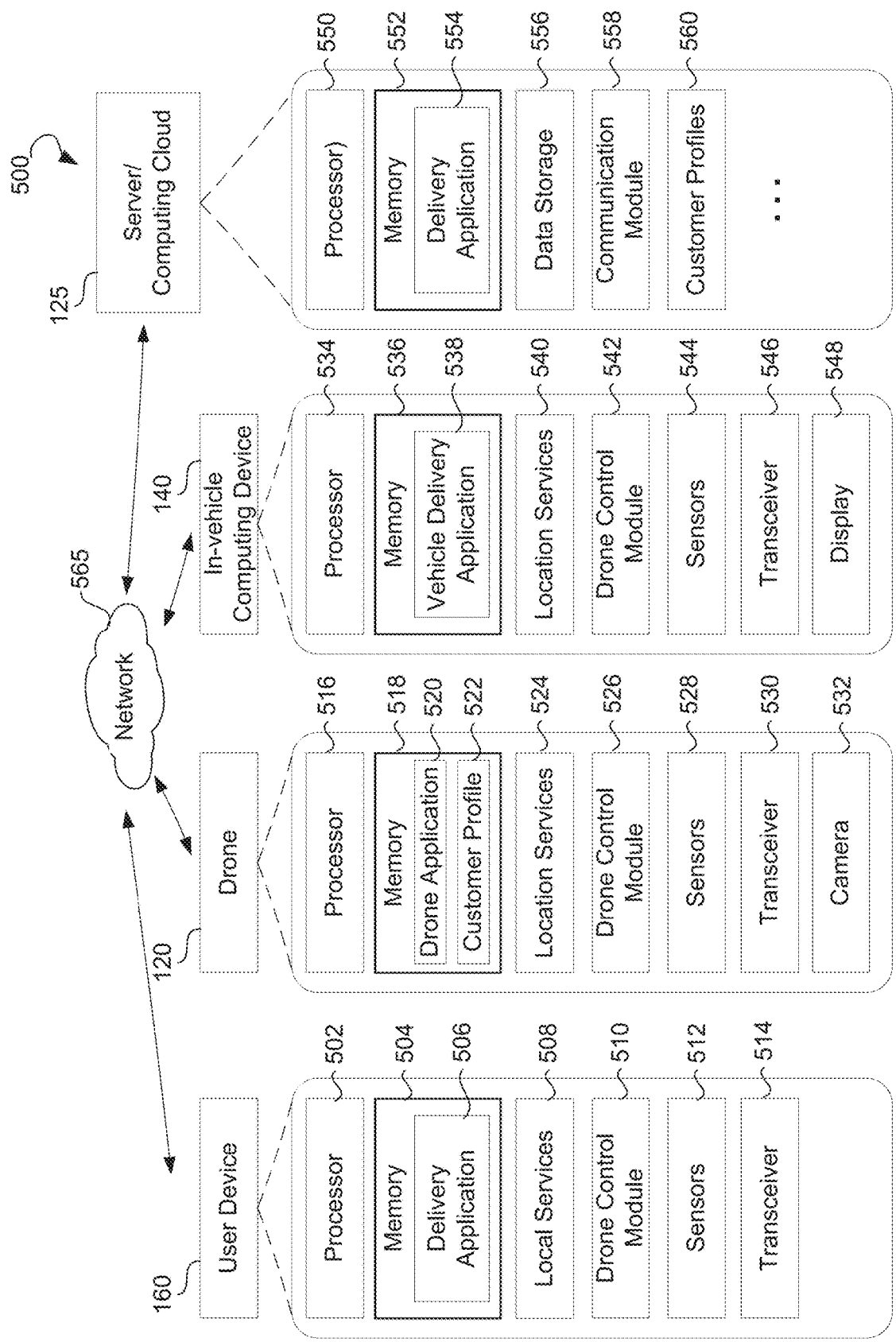
FIG. 4 is a block diagram of an example computer architecture for drone control and transfer of drone control, in accordance with one or more example embodiments of the disclosure.

FIG. 4 is a schematic illustration of an example architecture 500 for a user device 160, drone 120, an in-vehicle computing device 140, and a server/computing cloud 125 for transferring control of a drone 120 from one device to another, in accordance with one or more example embodiments of the disclosure. The server/computing cloud 125 illustrated in FIGS. 1 and 4 may correspond to a computer system configured to implement the functionality discussed with respect to FIG. 1. Some or all of the individual components may be optional and/or different in various embodiments. The server/computing cloud 125 may be in communication with the in-vehicle computing device 140 of the vehicle, the user device 160 associated with a customer and a computing device associated with a driver, and the drone 120 via a network 565. The in-vehicle computing device 140 of the vehicle may be in wireless communication with the user device 160 associated with the customer and in wireless communication with the computing device associated with the driver. The wireless communication may be established using a wireless protocol, such as WiFi™ direct, Bluetooth™, Near Field Communication (NFC), and the like.

The network 565 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks, wide area networks, local area networks, personal area networks, ad hoc local networks, and so forth. In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial medium, a microwave medium, a radio frequency communication medium, a satellite communication medium, or any combination thereof.

The server/computing cloud 125 may include one or more processors 550, one or more memory devices (also referred to herein as memory 552), one or more communication module(s) 558, and a data storage 556. The server 125/computing cloud may also include one or more input/output (I/O) interface(s), one or more sensor(s) or sensor interface(s), one or more transceiver(s), one or more optional display components, one or more optional camera(s)/microphone(s). The server/computing cloud 125 may further include one or more bus(es) that functionally couple various components of the server/computing cloud 125. The server/computing cloud 125 may further include one or more antenna(e) that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, an NFC antenna for transmitting or receiving NFC signals, and so forth. These various components will be described in more detail hereinafter.

The bus(es) may include at least one of a system bus, a memory bus, an address bus, or a message bus, and may permit the exchange of information (e.g., data (including computer-executable code), signaling, etc.) between various components of the server/computing cloud 125. The bus(es) may include, without limitation, a memory bus or a memory controller, a peripheral bus, an accelerated graphics port, and so forth. The bus(es) may be associated with any suitable bus architecture.

The memory 284 of the server/computing cloud 125 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 556 may include removable storage and/or non-removable storage including, but not limited to, magnetic storage, optical disk storage, and/or tape storage. The data storage 556 may provide non-volatile storage of computer-executable instructions and other data.

The data storage 556 may store computer-executable code, instructions, or the like that may be loadable into the memory 552 and executable by the processor(s) 550 to cause the processor(s) 550 to perform or initiate various operations. The data storage 556 may additionally store data that may be copied to the memory 552 for use by the processor(s) 550 during the execution of the computer-executable instructions. More specifically, the data storage may store one or more operating systems (O/S); one or more database management systems; and one or more program module(s), applications, engines, computer-executable code, scripts, or the like such as, for example, one or more delivery application(s) 554. Some or all of these module(s) may be sub-module(s). Any of the components depicted as being stored in the data storage 556 may include any combination of software, firmware, and/or hardware. The software and/or firmware may include computer-executable code, instructions, or the like that may be loaded into the memory 552 for execution by one or more of the processor(s) 550. Any of the components depicted as being stored in the data storage 552 may support functionality described in reference to corresponding components named earlier in this disclosure.

The processor(s) 550 may be configured to access the memory 552 and execute the computer-executable instructions loaded therein. For example, the processor(s) 550 may be configured to execute the computer-executable instructions of the various program module(s), applications, engines, or the like of the server/computing cloud 125 to cause or facilitate various operations to be performed in accordance with one or more embodiments of the disclosure. The processor(s) 550 may include any suitable processing unit capable of accepting data as input, processing the input data in accordance with stored computer-executable instructions, and generating output data. The processor(s) 550 may include any type of suitable processing unit.

The delivery application(s) 554 may include computer-executable instructions, code, or the like that responsive to execution by one or more of the processor(s) 550 may perform functions including, but not limited to, sending and/or receiving data, accessing and storing data in customer profiles 560 associated with a plurality of customers, and the like. The delivery application(s) 554 may be in communication with the in-vehicle computing device 140, the user device 160, the drone 120, and/or other components.

The data storage 556 may include a database for storing information regarding vehicles, delivery destinations, customers, and so forth. The database may use any of a variety of database models (e.g., relational model, object model, etc.) and may support any of a variety of query languages.

The communication module 558 may include one or more network interface one or more network interface(s) via which the server/computing cloud 125 may communicate with any of a variety of other systems, platforms, networks, devices, and so forth. The network interface(s) may enable communication, for example, with one or more wireless routers, one or more host servers, one or more web servers, and the like via one or more networks.

It should further be appreciated that the server/computing cloud 125 may include alternate and/or additional hardware, software, or firmware components beyond those described or depicted without departing from the scope of the disclosure.

The user device 160, as well as the computing device associated with the driver of the vehicle, may include one or more computer processor(s) 502, one or more memory devices (also referred as a memory 504), and one or more mobile applications, such as a delivery application 506 of the user device 160, location services 508, drone control module 510, sensors 512, and a transceiver 514. Other embodiments may include different components.

The processor(s) 502 may be configured to access the memory 504 and execute the computer-executable instructions loaded therein. For example, the processor(s) 502 may be configured to execute the computer-executable instructions of the various program module(s), applications, engines, or the like of the device to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit.

The memory 504 may include volatile memory (memory that maintains its state when supplied with power) such as RAM and/or non-volatile memory (memory that maintains its state even when not supplied with power) such as ROM, flash memory, FRAM, and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the user device 160, the delivery application 506 may be a mobile application executable by the processor 502 that can be used to present options and/or receive user inputs of information related to delivery of items by the drone 120.

The user device 160 may include location services 508, for example a GPS module, to determine location of the user device 160. The user device 160 may include sensors 512, such as proximity sensor, accelerometer, gyroscopes, and so forth. The user device 160 may use the drone control module 510 and the transceiver 514 to communicate with the drone 120, the in-vehicle computing device 140, and the server/computing cloud 125 via one or more wireless network protocols.

The in-vehicle computing device 140 of the vehicle may include one or more computer processor(s) 534, one or more memory devices (also referred to as a memory 536), one or more sensors 544, and one or more applications, such as a vehicle delivery application 538, location services 540, drone control module 542, transceiver 546, and a display 548. Other embodiments may include different components.

The processor(s) 534 may be configured to access the memory 536 and execute the computer-executable instructions loaded therein. For example, the processor(s) 534 may be configured to execute the computer-executable instructions of the various program module(s), applications, engines, or the like of the device to cause or facilitate various operations to be performed in accordance with one or more embodiments of the disclosure. The processor(s) 534 may include any suitable processing unit capable of accepting data as input, processing the input data in accordance with stored computer-executable instructions, and generating output data. The processor(s) 534 may include any type of suitable processing unit.

The memory 536 may include volatile memory (memory that maintains its state when supplied with power) such as RAM and/or non-volatile memory (memory that maintains its state even when not supplied with power) such as ROM, flash memory, FRAM, and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The location services 540 may include a GPS module, to determine location of the vehicle. The sensors 544 may include proximity sensors, accelerometers, gyroscopes, and so forth. The drone control module 542 and the transceiver 546 may be used to communicate with the user device 150, drone 120, and server/computing cloud 125 via one or more wireless network protocols.

Referring now to functionality supported by the in-vehicle computing device 140, the vehicle delivery application 538 may be a mobile application executable by the processor 534 that can be used to receive and process data from the sensors 544, receive and execute data form the user device 160 and the drone 120, and/or control operation of the vehicle.

The drone 120 may include one or more computer processor(s) 516, one or more memory devices (also referred as a memory 518), one or more applications, such as drone application 520, locations services 524, drone control module 526, sensors 528, transceiver, and a camera 532. Other embodiments may include different components.

The processor(s) 516 may be configured to access the memory 518 and execute the computer-executable instructions loaded therein. For example, the processor(s) 516 may be configured to execute the computer-executable instructions of the various program module(s), applications, engines, or the like of the device to cause or facilitate various operations to be performed in accordance with one or more embodiments of the disclosure. The processor(s) 516 may include any suitable processing unit capable of accepting data as input, processing the input data in accordance with stored computer-executable instructions, and generating output data. The processor(s) 516 may include any type of suitable processing unit.

The memory 518 may include volatile memory (memory that maintains its state when supplied with power) such as RAM and/or non-volatile memory (memory that maintains its state even when not supplied with power) such as ROM, flash memory, FRAM, and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The location services 524 of the drone 120 may include, for example a GPS module, to determine location of the drone 120. The sensors 528 may include proximity sensors, accelerometers, gyroscopes, and so forth. The drone control module 526 and the transceiver 530 may be used to communicate with the user device 160, the in-vehicle computing device 140, and the server/computing cloud 125 via one or more wireless network protocols. The camera 532 of the drone 120 may be used to capture image data and/or video data associated with locations of the customer.

Referring now to functionality supported by the drone 120, the drone application 520 may be a mobile application executable by the processor 516 that can be used to present options and/or receive user inputs of information related to delivery of items.

One or more operations of the methods, process flows, and use cases of FIGS. 1-3E may be performed by a device having the illustrative configuration depicted in FIG. 4, or more specifically, by one or more processors, program module(s), applications, or the like executable on such a device. It should be appreciated, however, that such operations may be implemented in connection with numerous other device configurations.

The operations described and depicted in the illustrative methods and process flows of FIGS. 1-3E may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-3E may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the CRSM produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

EXAMPLE EMBODIMENTS

In some instances, the following examples may be implemented together or separately by the systems and methods described herein.

Example 1 may include a method comprising: accepting, by a drone control module of a computing device, a destination associated with a user; establishing, by the drone control module, a channel of communication with a user device of the user; launching, by the drone control module, the drone from a first location; transmitting, by the drone control module, control data for the drone to the user device via the channel of communication; and transferring, by the drone control module, an operational control of the drone to the user device.

Example 2 may include the method of example 1, further comprising: receiving, by the drone control module, user data associated with the user; and determining, by the drone control module and based on the user data, that the user is able to control the drone.

Example 3 may include the method of example 1 and/or some other example herein, further comprising: transmitting, by the drone control module to the user device, a request to control the drone; and receiving, by the drone control module from the user device, an acceptance of the request to control the drone, wherein the control data for the drone is transmitted to the user device in response to receiving the acceptance of the request to control the drone.

Example 4 may include the method of example 1 and/or some other example herein, wherein the control data comprises drone data and instructions for controlling the drone.

Example 5 may include the method of example 1 and/or some other example herein, further comprising determining, by the drone control module, that the user device is technically capable of controlling the drone.

Example 6 may include the method of example 1 and/or some other example herein, wherein the transferring the operational control of the drone to the user device comprises: receiving, by the drone control module, from the user device, drone control commands, wherein the drone control commands are configured to control at least one operational parameter of the drone; and transmitting, by the drone control module, the drone control commands to the drone.

Example 7 may include the method of example 1 and/or some other example herein, wherein the drone is configured to deliver at least one item to the destination, the method further comprising: capturing a current picture of the user controlling the drone; comparing the current picture of the user to a stored picture of the user to determine if the current picture of the user is a facial recognition match to the stored picture; and delivering, based on a positive determination of the facial recognition match, the at least one item to the destination.

Example 8 may include the method of example 1 and/or some other example herein, further comprising: determining, by the drone control module, that the drone has reached the destination; and transferring, by the drone control module, the operational control of the drone from the user device to the drone control module to return the drone from the destination to the first location.

Example 9 may include the method of example 1 and/or some other example herein, further comprising: collecting routing data of the drone from the first location to the destination, wherein the routing data is stored to a database to enable a future autonomous flight of the drone to the destination.

Example 10 may include the method of example 9 and/or some other example herein, wherein the routing data comprises one or more of: a global positioning system location of the drone, an altitude of the drone, a picture of the destination, and a video of the destination.

Example 11 may include the method of example 9 and/or some other example herein, further comprising: determining, by the drone control module, that the drone has previously delivered at least one item to the destination; retrieving, by the drone control module, the routing data associated with the destination from the database; and instructing, by the drone control module and based on the routing data, the drone to autonomously fly to the destination.

Example 12 may include the method of example 9 and/or some other example herein, further comprising: receiving, by the drone control module, a current image of the destination; comparing, by the drone control module, the current image to a stored image of the destination; retrieving, by the drone control module and based on a match of the current image and the stored image, the routing data associated with the destination from the database; and instructing, by the drone control module and based on the routing data, the drone to autonomously fly to the destination.

Example 13 may include the method of example 1 and/or some other example herein, further comprising: determining, by the drone control module, that a predetermined emergency condition occurred at the drone while the drone is under the operational control of the user device; and transferring, by the drone control module and based on the determination of the occurrence of the predetermined emergency condition, the operational control of the drone from the user device to the drone control module.

Example 14 may include the method of example 13 and/or some other example herein, wherein the predetermined emergency condition includes one of: a request of the user to transfer the operational control to the drone control module, mishandling the drone by the user, and capturing via a camera of the drone a predetermined condition for the transferring of the operational control to the drone control module.

Example 15 may include a method comprising: accepting, by a drone control module associated with a delivery vehicle, a destination associated with a user; establishing, by the drone control module, a channel of communication with a user computing device of the user; launching, by the drone control module, the drone from the delivery vehicle; transmitting, by the drone control module, control data for the drone to the user computing device via the channel of communication; and transferring, by the drone control module, an operational control of the drone to the user computing device.

Example 16 may include the method of example 15, further comprising: determining, by the drone control module, that the drone has reached the destination; and transferring, by the drone control module, the operational control of the drone from the user device to the drone control module to return the drone from the destination to the first location.

Example 17 may include the method of example 15 and/or some other example herein, further comprising: collecting routing data of the drone from the first location to the destination, wherein the routing data is stored to a database to enable a future autonomous flight of the drone to the destination.

Example 18 may include the method of example 17 and/or some other example herein, further comprising: determining, by the drone control module, that the drone has previously delivered at least one item to the destination; retrieving, by the drone control module, the routing data associated with the destination from the database; and instructing, by the drone control module and based on the routing data, the drone to autonomously fly to the destination.

Example 19 may include a method comprising: accepting, by a drone control module of a computing device, a destination associated with a user; establishing, by the drone control module, a channel of communication with a user device of the user; launching, by the drone control module, the drone from a first location; transmitting, by the drone control module, control data for the drone to the user device via the channel of communication; and transferring, by the drone control module, an operational control of the drone to the user device, wherein the transferring the operational control of the drone to the user device comprises: receiving, by the drone control module, from the user device, drone control commands, wherein the drone control commands are configured to control at least one operational parameter of the drone; and transmitting, by the drone control module, the drone control commands to the drone.

Example 20 may include the method of example 19, further comprising: determining, by the drone control module, that a predetermined emergency condition occurred at the drone while the drone is under the operational control of the user device; and transferring, by the drone control module and based on the determination of the occurrence of the predetermined emergency condition, the operational control of the drone from the user device to the drone control module.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   accepting, by a drone control module of a computing device, a destination associated with a user;
   establishing, by the drone control module, a channel of communication with a user device of the user;
   launching, by the drone control module, the drone from a first location;
   transmitting, by the drone control module, control data for the drone to the user device via the channel of communication; and transferring, by the drone control module, an operational control of the drone to the user device.

2. The method of claim 1, further comprising:
receiving, by the drone control module, user data associated with the user; and
determining, by the drone control module and based on the user data, that the user is able to control the drone.

3. The method of claim 1, further comprising:
transmitting, by the drone control module to the user device, a request to control the drone; and
receiving, by the drone control module from the user device, an acceptance of the request to control the drone,
wherein the control data for the drone is transmitted to the user device in response to receiving the acceptance of the request to control the drone.

4. The method of claim 1, wherein the control data comprises drone data and instructions for controlling the drone.

5. The method of claim 1, further comprising determining, by the drone control module, that the user device is capable of controlling the drone.

6. The method of claim 1, wherein the transferring the operational control of the drone to the user device comprises:
receiving, by the drone control module, from the user device, drone control commands, wherein the drone control commands are configured to control at least one operational parameter of the drone; and
transmitting, by the drone control module, the drone control commands to the drone.

7. The method of claim 1, wherein the drone is configured to deliver at least one item to the destination, the method further comprising:
capturing a current picture of the user controlling the drone;
comparing the current picture of the user to a stored picture of the user to determine that the current picture of the user is a facial recognition match to the stored picture; and
delivering, based on a positive determination of the facial recognition match, the at least one item to the destination.

8. The method of claim 1, further comprising:
determining, by the drone control module, that the drone has reached the destination; and
transferring, by the drone control module, the operational control of the drone from the user device to the drone control module to return the drone from the destination to the first location.

9. The method of claim 1, further comprising:
collecting routing data of the drone from the first location to the destination,
wherein the routing data is stored to a database to enable a future autonomous flight of the drone to the destination.

10. The method of claim 9, wherein the routing data comprises one or more of: a global positioning system location of the drone, an altitude of the drone, a picture of the destination, and a video of the destination.

11. The method of claim 9, further comprising:
determining, by the drone control module, that the drone has previously delivered at least one item to the destination;
retrieving, by the drone control module, the routing data associated with the destination from the database; and
instructing, by the drone control module and based on the routing data, the drone to autonomously fly to the destination.

12. The method of claim 9, further comprising:
receiving, by the drone control module, a current image of the destination;
comparing, by the drone control module, the current image to a stored image of the destination;
retrieving, by the drone control module and based on a match of the current image and the stored image, the routing data associated with the destination from the database; and
instructing, by the drone control module and based on the routing data, the drone to autonomously fly to the destination.

13. The method of claim 1, further comprising:
determining, by the drone control module, that a predetermined emergency condition occurred at the drone while the drone is under the operational control of the user device; and
transferring, by the drone control module and based on the determination of the occurrence of the predetermined emergency condition, the operational control of the drone from the user device to the drone control module.

14. The method of claim 13, wherein the predetermined emergency condition includes one of: a request of the user to transfer the operational control to the drone control module, mishandling the drone by the user, and capturing via a camera of the drone a predetermined condition for the transferring of the operational control to the drone control module.

15. A method comprising:
accepting, by a drone control module of a computing device, a destination associated with a user;
establishing, by the drone control module, a channel of communication with a user device of the user;
launching, by the drone control module, the drone from a first location;
transmitting, by the drone control module, control data for the drone to the user device via the channel of communication; and
transferring, by the drone control module, an operational control of the drone to the user device, wherein the transferring the operational control of the drone to the user device comprises:
receiving, by the drone control module, from the user device, drone control commands, wherein the drone control commands are configured to control at least one operational parameter of the drone; and
transmitting, by the drone control module, the drone control commands to the drone.

16. The method of claim 15, further comprising:
determining, by the drone control module, that a predetermined emergency condition occurred at the drone while the drone is under the operational control of the user device; and
transferring, by the drone control module and based on the determination of the occurrence of the predetermined emergency condition, the operational control of the drone from the user device to the drone control module.

* * * * *